UNITED STATES PATENT OFFICE.

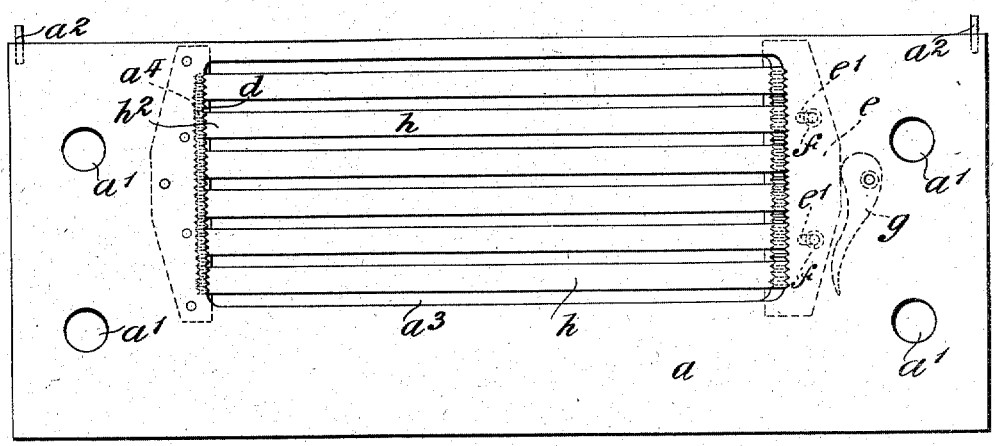
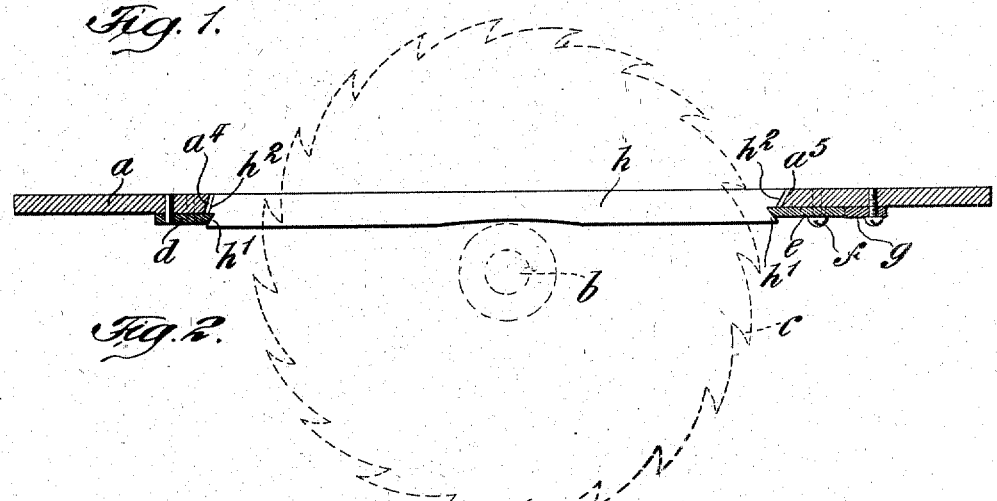
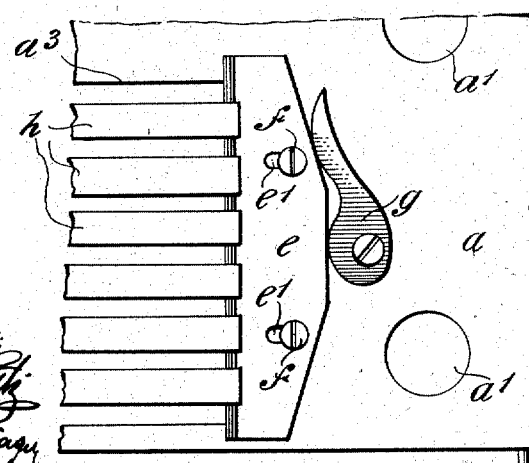

ELIJAH J. OSBURN, JR., OF BROOKLYN, NEW YORK.

SAW-TABLE.

984,237.

Specification of Letters Patent. Patented Feb. 14, 1911.

Application filed July 1, 1909. Serial No. 505,358.

*To all whom it may concern:*

Be it known that I, ELIJAH J. OSBURN, Jr., of Brooklyn, Kings county, State of New York, have invented certain new and useful Improvements in Saw-Tables, of which the following is a full, clear, and exact specification, such as will enable others skilled in the art to which it appertains to make and use the same.
My invention relates to a plate for saw tables, by which a wide degree of adjustment of the saw is allowed and by which the use of a plurality of saws in gangs is permitted.

In carrying out my invention, I provide a plate which is intended to set in a recess in a table and in which are fastened a number of spacer bars. These bars are arranged to have one or more of the saws extended between them and they are fastened in the plate in such a way that they may be freely adjusted to permit of equal free adjustment of the saw plates. Preferably, said bars have their ends arranged to interlock with corresponding surfaces on the plate, of which surfaces one is carried on a movable clamping head, so that the manipulation of this clamping head secures or releases the spacer bars.

My invention involves other features of importance, all of which will be fully set forth hereinafter and particularly pointed out in the claims.

Reference is had to the accompanying drawings, which represent, as an example, the preferred embodiment of my invention, in which drawings,—

Figure 1 is a plan view of the plate with the spacer bars thereon; Fig. 2 is a longitudinal section thereof; and Fig. 3 is an enlarged bottom plan view showing the clamping head and the connected parts.

$a$ indicates the plate, which is set into a recess into the saw table. This plate is preferably provided with finger holes $a'$ to facilitate lifting it in and out of position, and also with stud pins $a^2$, which engage the table to hold the plate spaced from the edge of the opening in which the plate is situated. This plate $a$ is formed of metal and has an opening $a^3$ therein. Said opening $a^3$ is located over the position of the saw arbor (see the broken lines in Fig. 2), and is so positioned that the saws (one of which is indicated at $e$ in Fig. 2) may project upward through the opening. The work is moved over the table and plate $a$, and in so moving encounters the saws which cut the work.

One end wall of the opening $a^3$ in the plate $a$ is under-cut and serrated, as indicated at $a^4$, and below this edge is arranged a supporting plate $d$, which is riveted or otherwise fastened to the bottom of the plate $a$, and which is formed with an under-cut inner edge projecting inward slightly beyond the serrated wall $a^4$. The opposite wall, or edge of the opening $a^3$, is serrated and beveled as indicated at $a^5$. Below this edge $a^5$ is arranged the clamping head $e$. Normally the clamping head $e$ projects beyond the edge $a^5$ and is under-cut at its inner edge as Fig. 2 illustrates. This clamping head is formed with slots $e'$ (see Fig. 3), in which are received pins $f$ secured to the plate $a$. The slots $e$ are transversely disposed and in this manner the clamping head $e$ is arranged to move from the inward position shown in Fig. 2 to an outward position in which the under-cut inner edge of the head $e$ lies in a position coextensive with the edge $a^5$ of the plate $a$.

$g$ indicates a cam or other desired means which may be employed for manipulating the clamping head, so that it will take either of said positions described.

$h$ indicates the spacer bars. These are of a length equal to the length of the opening $a^3$ and lie in said opening parallel to each other, so that the saws may project between them. Each end of the spacer bars $h$ is formed with an under-cut surface $h'$ at the bottom portion, and above these under-cut surfaces are formed serrated surfaces $h^2$ which match with the serrated surfaces $a^4$ and $a^5$ and are inclined correspondingly to such surfaces.

To insert the spacer bars in position the clamping head $e$ is drawn back from the position shown in Fig. 2 and the ends of the bars opposite the clamping head are first engaged with the supporting plate $d$ and serrated edge $a^4$, the serrations of the bars locking with the serrations of the plate $a$ and holding the bars properly spaced from each other. When this has been accomplished, the other ends of the bars are dropped down upon the serrated edge $a^5$ and the bars will thus be supported in opening $a^3$. Finally the clamping head is returned to its active position so that it engages the under-cut edges $h'$ at the ends of the bars adjacent to the head, thus firmly locking the spacer bars in position.

This device, it will be observed, provides for very rapid and easy adjustment of the spacer bars and holds them securely in position. By thus adjusting the bars their positions may be changed to suit changes in the positions of the saws, as well as the number and size of the saws.

The invention is adapted to any standard circular saw and the plate *a* with its adjustments may be so proportioned as to take the place of the wooden saw plate with which such machines are usually provided.

Having thus described my invention what I claim as new and desire to secure by Letters Patent of the United States, is:

1. A saw table plate having an opening therein, spacer bars fitted in said opening and a clamping head movable into and out of engagement with the ends of the bars to clamp them into position.

2. A saw table plate having an opening therein, a spacer bar, one end of which is interlocked with a wall of the opening and a clamping head movable in the plane of the bar to engage and disengage the opposite end of the spacer bar to hold it in position.

3. A saw table plate having an opening therein, opposite walls of which are oppositely beveled, a supporting member under one of said beveled walls, a clamping head movable back and forth under either of said beveled walls and spacer bars having ends shaped correspondingly to said beveled walls and also beveled respectively to engage the supporting member and clamping head, for the purpose specified.

4. A saw table plate having an opening therein, opposite walls of which are oppositely beveled, a supporting member under one of said beveled walls, a clamping head movable back and forth under either of said beveled walls and spacer bars having ends shaped correspondingly to said beveled walls and also beveled respectively to engage the supporting member and clamping head, for the purpose specified, said oppositely beveled walls of the opening in the plate and the ends of the spacer bars engaged therewith being serrated and adapted to interengage.

5. A saw table plate having an opening therein, spacer bars fitting in said opening and a clamping head carried by said plate, adjacent to the ends of said bars and movable laterally toward and from said ends for simultaneously securing or releasing all of said bars.

6. A saw table plate having an opening therein, spacer bars fitting in said opening means at one end of said opening for supporting said bars, and retaining them against lateral movement and a member at the opposite end of said opening movable toward and from the ends of all said bars for engaging therewith to support the bars and hold them against lateral displacement.

7. A saw table plate having opening therein with a serrated edge at one end and series of spacer bars with serrated ends arranged to engage with the serrated edges of the plate, and a clamping head having a serrated edge and movable toward and from the opposite ends of said bars for supporting laterally and holding them against lateral displacement.

In testimony whereof I have signed my name to this specification in the presence of two subscribing witnesses.

ELIJAH J. OSBURN, Jr.

Witnesses:
  ISAAC B. OWENS,
  B. BIGGE.